(12) United States Patent
Admon et al.

(10) Patent No.: US 9,479,622 B2
(45) Date of Patent: Oct. 25, 2016

(54) OUT-OF-ORDER MESSAGE FILTERING WITH AGING

(71) Applicant: Broadcom Corporation, Irvine, CA (US)

(72) Inventors: Itay Admon, Tel-Aviv (IL); Golan Schzukin, Herzliya (IL); Amir Levy, Holon (IL); Alex Kertsman, Carmiel (IL)

(73) Assignee: Broadcom Corporation, Irvine, CA (US)

( * ) Notice: Subject to any disclaimer, the term of this patent is extended or adjusted under 35 U.S.C. 154(b) by 737 days.

(21) Appl. No.: 13/851,482

(22) Filed: Mar. 27, 2013

(65) Prior Publication Data

US 2014/0233573 A1 Aug. 21, 2014

Related U.S. Application Data

(60) Provisional application No. 61/765,452, filed on Feb. 15, 2013.

(51) Int. Cl.
*H04L 29/08* (2006.01)
*H04L 29/06* (2006.01)

(52) U.S. Cl.
CPC .......... *H04L 69/324* (2013.01); *H04L 69/22* (2013.01)

(58) Field of Classification Search
CPC .......... H04L 69/324; H04L 49/15; H04L 2012/565; H04L 49/552; H04L 49/205; G06F 9/3824; G06F 9/3855; G06F 9/383; G06F 9/3826
See application file for complete search history.

(56) References Cited

U.S. PATENT DOCUMENTS

| | | | | |
|---|---|---|---|---|
| 5,107,122 A | * | 4/1992 | Barkan | G01T 1/2928 250/370.01 |
| 2004/0143593 A1 | * | 7/2004 | Le Maut | H04L 49/552 |
| 2009/0013135 A1 | * | 1/2009 | Burger | G06F 9/3824 711/154 |
| 2011/0258421 A1 | * | 10/2011 | Elnozahy | G06F 11/3636 712/227 |
| 2012/0300650 A1 | * | 11/2012 | Claudius | H04L 61/2532 370/252 |
| 2013/0230047 A1 | * | 9/2013 | Subrahmaniam | H04L 47/2441 370/392 |

* cited by examiner

*Primary Examiner* — Yee Lam
(74) *Attorney, Agent, or Firm* — Sterne, Kessler, Goldstein & Fox P.L.L.C.

(57) ABSTRACT

The present disclosure is directed to a system and method for performing out-of-order message filtering with aging. The system and method can be used in a destination device that can receive messages out-of-order (i.e., in a different order than they were transmitted) from a source device. The system and method can filter-out or flag for appropriate handling these messages received out-of-order. To perform the above noted message filtering functionality, the system and method uses a database constructed from a content-addressable memory (CAM) and a random-access memory (RAM) to respectively remember source identifiers and sequence identifiers associated with previously received messages. A source identifier identifies the source of a message, and a sequence identifier identifies the transmission order of the message among the messages transmitted from the particular source. Each message can include a source identifier and a corresponding sequence identifier.

20 Claims, 4 Drawing Sheets

OUT-OF-ORDER MESSAGE FILTERING WITH AGING

CROSS REFERENCE TO RELATED APPLICATIONS

This application claims the benefit of U.S. Provisional Patent Application No. 61/765,452, filed Feb. 15, 2013, which is incorporated herein by reference.

TECHNICAL FIELD

This application relates generally to message filtering and, more specifically, to out-of-order message filtering.

BACKGROUND

In some systems, a source device and a destination device may be connected by more than one path. The different paths may have different latencies, potentially causing messages sent from the source device to be received out-of-order (i.e., in a different order than they were transmitted) at the destination device.

Applications making use of these systems may require messages sent from the source device and received out-of-order by the destination device to be filtered-out or at least flagged for appropriate handling. For example, an earlier transmitted message may contain out-dated information relative to the information contained by a later transmitted message. Processing the out-dated information contained by the earlier transmitted message at the destination device, after having received the later transmitted message, may be undesirable or even detrimental to the application making use of the information.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

Figure 1:
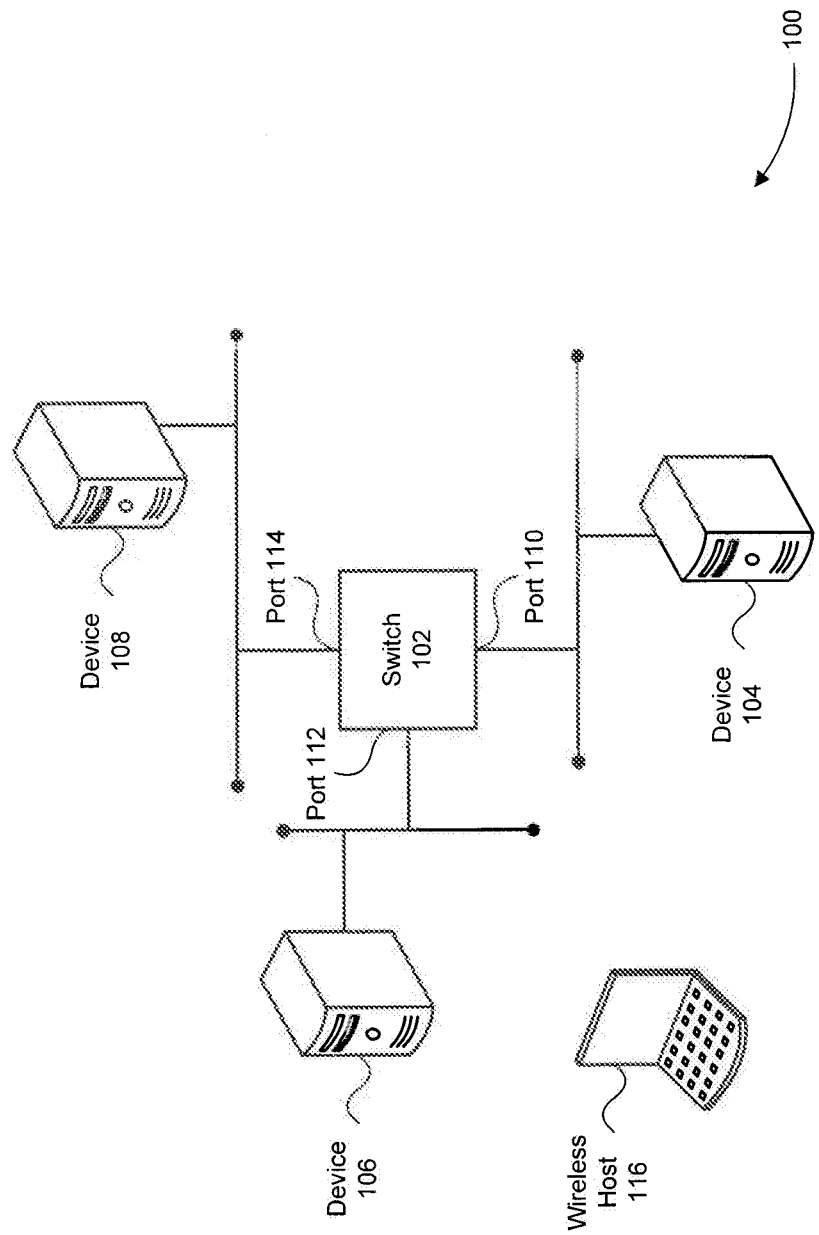
FIG. 1 illustrates a computer network in accordance with embodiments of the present disclosure.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

The present disclosure is directed to a system and method for performing out-of-order message filtering. The system and method can be used in a destination device that can receive messages out-of-order (i.e., in a different order than they were transmitted) from a source device. The system and method can filter-out or flag for appropriate handling these messages received out-of-order.

To perform the above noted message filtering functionality, the system and method uses a database constructed from a content-addressable memory (CAM) and a random-access memory (RAM) to respectively remember source identifiers and sequence identifiers associated with previously received messages. A source identifier identifies the source of a message, and a sequence identifier identifies the transmission order of the message among the messages transmitted from a particular source. A sequence identifier can be, for example, a number that monotonically increases or decreases with each transmitted message or a timestamp at which a message was transmitted. Each message can include a source identifier and a corresponding sequence identifier.

When a new message is received, the system and method can search the CAM that stores the source identifiers of previously received messages for the source identifier of the newly received message. If no matching source identifier is found, the newly received message can be sent for processing and the CAM and RAM respectively updated with the source identifier and the sequence identifier of the newly received message.

If, on the other hand, a matching source identifier is found, indicating that a previously received message was received from the same source as the newly received message, the sequence identifier corresponding to the matching source identifier in the CAM can be read from the RAM. For example, the CAM can provide the address in its memory where the matching source identifier is found. This address can then be used by the RAM to read from its memory the sequence identifier corresponding to the matching source identifier found in the CAM.

Once read from the RAM, the sequence identifier of the previously received message can be compared to the sequence identifier of the newly received message to determine whether the previously received message was transmitted before or after the newly received message. If the previously received message was transmitted before the newly received message, indicating that the newly received message was received in-order, the newly received message can be sent for processing and the CAM and RAM respectively updated with the source identifier and the sequence identifier of the newly received message. Otherwise, the newly received message was received out-of-order, and it can be filtered-out or flagged for appropriate handling.

In addition to the above filtering functionality, the system and method of the present disclosure can implement an aging function to remove source identifiers in the CAM that have been in the CAM too long. Aging ensures that the system and method of the present disclosure do not maintain old and possibly incorrect information in the CAM. Conventional aging techniques performed by out-of-order message filters generally require a pipelined implementation of the filter to stall because a single-port CAM cannot search or update its memory in the same clock cycle (or on the same rising or falling edge of a clock cycle in the case of a double data rate CAM) that an entry in its memory is being aged or removed. Because these conventional out-of-order filters stall their pipelines to perform aging, their message processing bandwidths are reduced and, in most cases, cut in half.

The system and method of the present disclosure overcome this reduction in message processing bandwidth by writing source identifiers into the CAM in a manner similar to how entries are written into a first-in first-out memory. In particular, the system and method of the present disclosure can store source identifiers of messages in the CAM in a manner that maintains the order in which the source identifiers were received (and thereby their relative ages). By doing so, a new source identifier can be written into the CAM by overwriting (a form of aging) the oldest source identifier in the CAM once some portion of the CAM memory is full. Thus, writing new source identifiers into the CAM occurs at the same time (i.e., during the same clock cycle or on the same rising or falling edge of a clock cycle in the case of a double data rate CAM) at which aging is performed.

However, this aging technique can undesirably result in the same source identifier being stored in the CAM at multiple addresses at the same time, with each having a different corresponding sequence identifier stored in the RAM. For example, in the instance where two messages from the same source are received very close in time and in-order, the respective source identifiers (which are the same) of each message would both be written into the CAM and present in the CAM's memory at the same time. These duplicate entries in the CAM would result in an issue when performing the above noted out-of-order message filtering functionality for another message received from the same source. Therefore, the system and method of the present disclosure can further implement a new type of CAM, referred to as an auto-invalidate CAM (ACAM). In general, an ACAM invalidates a stored entry in its memory after that entry has been matched to a search value. The use of an ACAM can eliminate the potential occurrence of duplicate source identifiers being in the CAM's memory at the same time.

Further details of the system and method of the present disclosure for performing out-of-order message filtering with aging are described below in the context of a frame forwarding example. It will be understood by one of ordinary skill in the art that the frame forwarding example described below provides only one context in which the system and method of the present disclosure can be implemented and that other possible contexts for implementation exist.

2. FRAME FORWARDING EXAMPLE

2.1 Switches

Many computer networks utilize a switch to connect devices together so that frames (a type of message) can be forwarded between the devices. Unlike a hub, a switch does not simply flood an incoming frame received from one device out each of its ports to all other devices. Rather, switches transmit an incoming frame only out the port connected to the device in which the frame was addressed, assuming such port is known. This helps to reduce unnecessary traffic on the network.

To further describe the functionality of a switch, FIG. 1 illustrates an exemplary Ethernet based local area network (LAN) 100 in accordance with embodiments of the present disclosure. As shown in FIG. 1, Ethernet based LAN 100 includes a switch 102 that connects devices 104, 106, and 108 through respective ports 110, 112, and 114. If switch 102 knows that device 104 is coupled to port 110, it can intelligently forward frames addressed to device 104 out port 110 without sending the frames to ports 112 and 114. For example, if device 106 sends a frame to device 104, switch 102 can forward the frame only to port 110 and not port 114 so that device 108 would not receive the frame.

To accomplish this intelligent forwarding operation, switch 102 needs to continually learn about its environment. Devices can not only join and leave Ethernet based LAN 100, but they can also move between ports on switch 102. For example, consider an example where devices 104 and 106 are wireless access points. If a wireless host 116 roams between these two access points, traffic coming from wireless host 116 will be seen by switch 102 as moving between ports 110 and 112. Switch 102 can keep track of the devices coupled to its ports by examining each incoming frame for a media access control (MAC) address that identifies the source device of the frame and then associating the MAC address with the port over which the frame is received in a forwarding table.

For example, assume that wireless host 116 is connected to device 104, which is acting as a wireless access point, and transmits a frame intended for reception by device 108. After wirelessly receiving the frame from wireless host 116, device 104 would forward the frame to switch 102 through port 110. Switch 102 would then take the opportunity, before forwarding the frame to device 108, to update its forwarding table by examining the incoming frame for the MAC address identifying the source device from which the frame was sent. In this instance, switch 102, after examining the incoming frame, would update its forwarding table to associate the MAC address of wireless host 116 with port 110. Using the updated forwarding table, switch 102 can then forward incoming frames that are intended for receipt by wireless host 116 only out port 110, rather than flooding these frames out each of its ports, to reduce the amount of traffic on Ethernet based LAN 100.

In the event that wireless host 116 moves from the wireless coverage area of device 104 to the wireless coverage area of device 106, which is also acting as a wireless access point, switch 102 will update its forwarding table to reflect that wireless host 116 has moved from port 110 to port 112. This update will occur when switch 102 receives a frame from wireless host 116 through port 112. However, in some instances, it may be possible for switch 102 to receive two transmitted frames from wireless host 116, one received through the port 110 to which it was previously coupled and the other received through the port 112 to which it is currently coupled, out-of-order. In other words, switch 102 will receive the earlier transmitted frame from wireless host 116 through port 110 after it has received the later transmitted frame from wireless host 116 through port 112. This out-of-order frame reception can occur, for example, due to different connection latencies in Ethernet based LAN 100. Because the frames are received out-of-order, switch 102 will incorrectly determine that wireless host 116 is connected to port 110, rather than port 112, and forward frames intended for wireless host 116 to that port.

2.2 Out-of-Order Frame Filter

Figure 2:
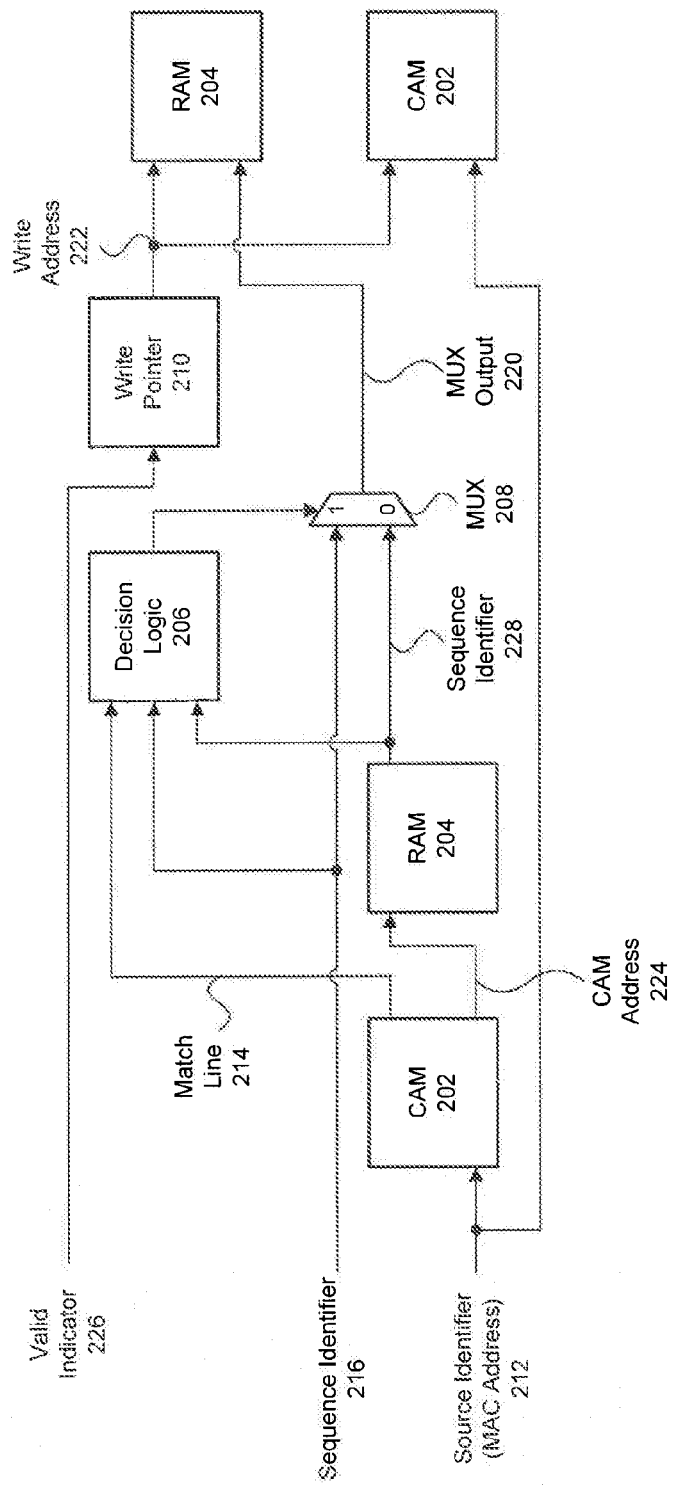
FIG. 2 illustrates an out-of-order message filter in accordance with embodiments of the present disclosure.

The system and method of the present disclosure can be used to filter out these out-of-order frames to prevent such an error condition from occurring. For example, FIG. 2 illustrates an out-of-order frame filter 200 in accordance with embodiments of the present disclosure. Out-of-order frame filter 200 includes a content-addressable memory (CAM) 202, a random-access memory (RAM) 204, decision logic 206, a multiplexer (MUX) 208, and a write pointer 210.

To perform the above noted frame filtering functionality, out-of-order frame filter 200 uses a database constructed from CAM 202 and RAM 204 to respectively remember source identifiers and sequence identifiers associated with frames previously received by switch 102. A source identifier identifies the source of a frame, and a sequence identifier identifies the transmission order of the frame among the frames transmitted from a particular source. Each frame can include a source identifier and a corresponding sequence identifier. In the specific context of out-of-order message filter 200 operating in Ethernet based LAN 100 as part of switch 102, a source identifier corresponds to a MAC address included in a frame that indicates the source device from which the frame was sent. A sequence identifier can be, for example, a number that monotonically increases or decreases with each transmitted frame or a timestamp at which a frame was transmitted.

When a new frame is received by switch 102, out-of-order message filter 200 can control CAM 202 that stores the source identifiers of previously received frames to search its memory for a source identifier 212 of the newly received frame. If no matching source identifier is found in CAM 202, as indicated by match line 214, the newly received message can be used to update the forwarding table of switch 102, and CAM 202 and RAM 204 can be respectively updated with the source identifier 212 and the sequence identifier 216 of the newly received message. Specifically, decision logic 206 can control MUX 208, based on match line 214 indicating that no match was found, to select sequence identifier 216 of the newly received frame to be placed on MUX output 220. MUX output 220 can then be written into RAM 204 at write address 222, and source identifier 212 can be written into CAM 202 at write address 222. In another embodiment, MUX output 220 can be written into RAM 204 at an address determined based on, but nevertheless different from, write address 222. Write address 222 is provided by write pointer 210.

If, on the other hand, a matching source identifier is found in CAM 202, indicating that a previously received frame was received from the same source as the newly received frame, the sequence identifier corresponding to the matching source identifier in CAM 202 can be read from RAM 204. For example, CAM 202 can provide the address in its memory, shown as CAM address 224 in FIG. 2, where the matching source identifier is found. CAM address 224 can then be used by RAM 204 to lead from its memory sequence identifier 228 corresponding to the matching source identifier found in CAM 202. In one embodiment, sequence identifier 228 is stored in RAM 204 at CAM address 224. In another embodiment, sequence identifier 228 is stored in RAM 204 at an address determined based on, but nevertheless different from, CAM address 224.

Once read from RAM 204, sequence identifier 228 of the previously received frame can be compared to sequence identifier 216 of the newly received frame by decision logic 206 to determine whether the previously received frame was transmitted before or after the newly received frame. If the previously received frame was transmitted before the newly received frame, indicating that the newly received frame was received in-order, the newly received frame can be used to update the forwarding table of switch 102, and CAM 202 and RAM 204 can be respectively updated with source identifier 212 and sequence identifier 216 of the newly received frame. Specifically, decision logic 206 can control MUX 208, based on match line 214 indicating a matching source identifier is found in CAM 202 and the comparison indicating that the newly received frame was received in-order, to select sequence identifier 216 to be placed on MUX output 220. MUX output 220 can then be written into RAM 204 at write address 222, and source identifier 212 can be written into CAM 202 at write address 222. In another embodiment, MUX output 220 can be written into RAM 204 at an address determined based on, but nevertheless different from, write address 222. Write address 222 is provided by write pointer 210.

Otherwise, if the comparison performed by decision logic 206 determines that the newly received message was received out-of-order, the newly received message can be filtered-out or flagged for appropriate handling so that it is not used to update forwarding table of switch 102. In addition, decision logic 206 can control MUX 208, based on the comparison indicating that the newly received frame was received out-of-order, to select sequence identifier 228 to be placed on MUX output 220. MUX output 220 can then be written into RAM 204 at write address 222, and source identifier 212 can be written into CAM 202 at write address 222. In another embodiment, MUX output 220 can be written into RAM 204 at an address determined based on, but nevertheless different from, write address 222. Write address 222 is provided by write pointer 210.

It should be noted that the output signal from decision logic 206 feeding into MUX 208 to select which of its input signals will be placed on MUX output 220, can be used by switch 102 to signal whether a newly received frame can be used to update the forwarding table. It should be further noted that write pointer 210 can monotonically increment or decrement write address 222 (e.g., using a counter) each time a new frame is received, as indicated by valid indicator 226, or each time a source identifier is stored in CAM 202 and/or a sequence identifier is stored RAM 204. Write pointer 210 can eventually restart write address 222 back at an initial or starting address once some maximal or minimal address is reached (e.g., the last or first address in CAM 202 and/or RAM 204).

Figure 3:
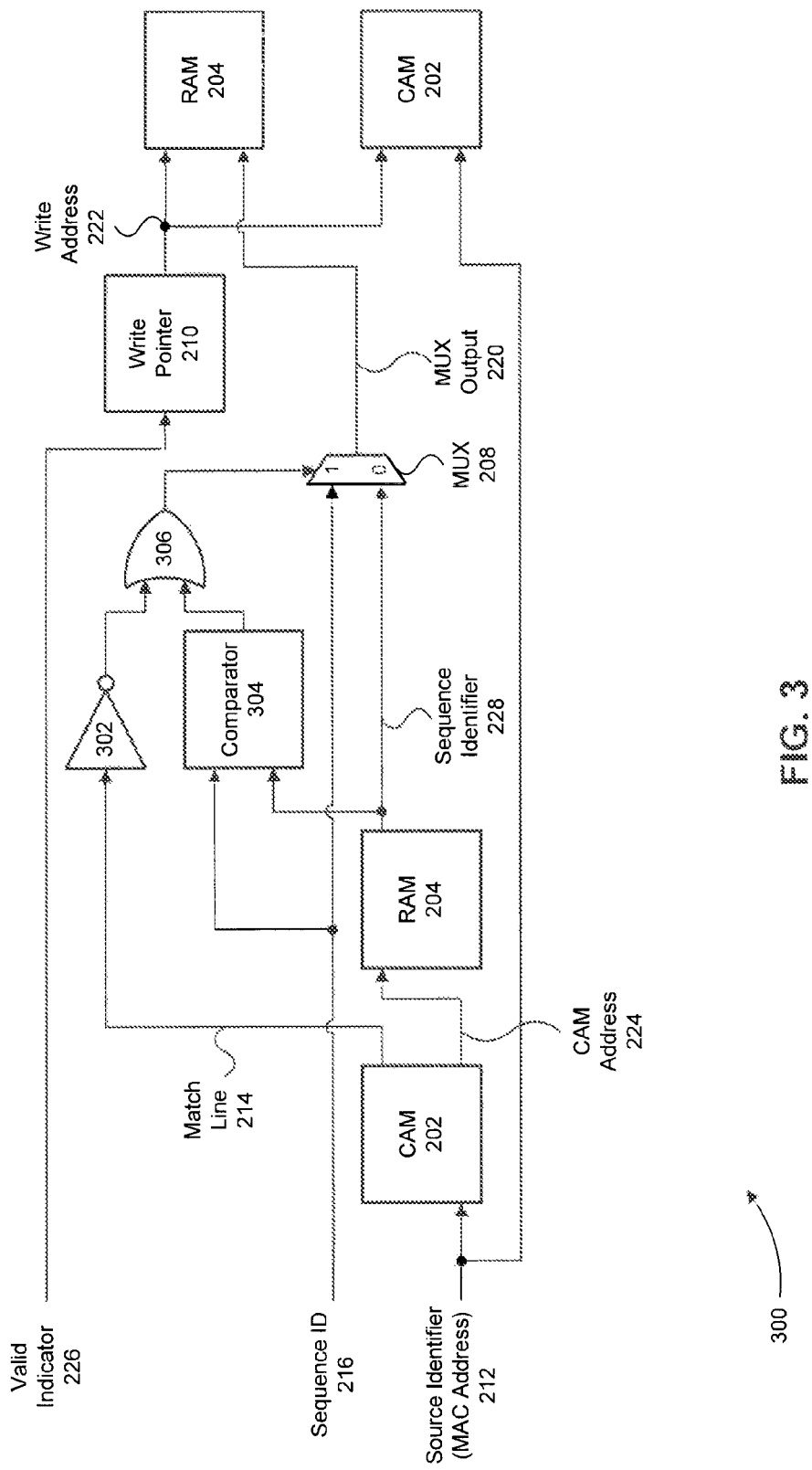
FIG. 3 illustrates another out-of-order message filter in accordance with embodiments of the present disclosure.

Referring now to FIG. 3, another out-of-order frame filter 300 is illustrated in accordance with embodiments of the present disclosure. Out-of-order frame filter 300 has substantially the same configuration as out-of-order frame filter 200 in FIG. 2 with the exception that decision logic 206 has been replaced with three components: an inverter 302, a comparator 304, and an or gate 306. These three components can be used to control MUX 208 to select an appropriate one of its two input signals as discussed above in FIG. 2. Match line 214 can be at a logical high when a matching value is found in CAM 202 and at a logical low when no matching value is found in CAM 202. The output of comparator 304 is at a logical high when, after comparing sequence identifier 216 of a newly received frame to sequence identifier 228 of a previously received frame from the same source, it determines that the newly transmitted frame was transmitted after the previously received frame and thus is received in order. Otherwise, the output of comparator 304 can be at a logical low.

2.3 Out-of-Order Frame Filter with Aging

In addition to the above filtering functionality, out-of-order frame filters 200 and 300 can implement an aging function to remove source identifiers in CAM 202 that have been in CAM 202 too long. Aging ensures that out-of-order frame filter 200 does not maintain old and possibly incorrect information in CAM 202, which can occur, for example, after devices disconnect from switch 102. Conventional aging techniques performed by out-of-order frame filters generally require a pipelined implementation of the filter to stall because a single-port CAM cannot search or update its memory in the same clock cycle (or on the same rising or falling edge of a clock cycle in the case of a double data rate CAM) that an entry in its memory is being aged or removed. Because these conventional out-of-order frame filters must stall their pipelines to perform aging, their frame processing bandwidths are reduced and, in most cases, cut in half.

Out-of-order frame filters 200 and 300 can overcome this reduction in message processing bandwidth by writing source identifiers into CAM 202 in a manner similar to how entries are written into a first-in first-out memory. In particular, out-of-order frame filters 200 and 300 can store source identifiers of frames in CAM 202 in a manner that maintains the order in which the source identifiers were received or written into CAM 202 (and thereby their relative ages). By doing so, a new source identifier can be written into CAM 202 by overwriting (a form of aging) the oldest source identifier in CAM 202 once some portion of the CAM memory is full. Thus, writing new source identifiers into CAM 202 occurs at the same, time (i.e., during the same clock cycle or on the same rising or falling edge of a clock cycle in the case of a double data rate CAM) at which aging is performed.

However, this aging technique can undesirably result in the same source identifier being stored in CAM 202 at multiple addresses, with each having a different corresponding sequence identifier stored in RAM 204. For example, in the instance where two frames from the same source are received very close in time and in-order, the respective source identifiers (which are the same) of each frame would both be written into CAM 202 and present in the memory of CAM 202 at the same time. These duplicate entries in CAM 202 would result in an issue when performing the above noted out-of-order frame filtering functionality for another frame received from the same source. Therefore, out-of-order frame filters 200 and 300 can further implement CAM 202 as an auto-invalidate CAM (ACAM).

In general, an ACAM invalidates a stored entry in its memory after the entry has been matched to a search word. The use of an ACAM can eliminate the potential occurrence of duplicate source identifiers being in CAM 202 at the same time. An ACAM can be implemented by associating an extra bit, referred to as a valid bit, with each stored value in its memory. The valid bit can be, for example, set to a logical one value if the stored entry is valid, and set to a logical zero value if the stored entry is invalid. Thus, when the ACAM is searching its contents for an entry that matches a search word, the ACAM can only return an entry that matches the search word and that has its valid bit set to a logical one value. After matching an entry to a search word, the ACAM can then set the valid bit of the matching entry to a logical zero so that the matching entry is invalidated will no longer match to a search word.

2.4 Method for Filtering Out-of-Order Frames

Figure 4:
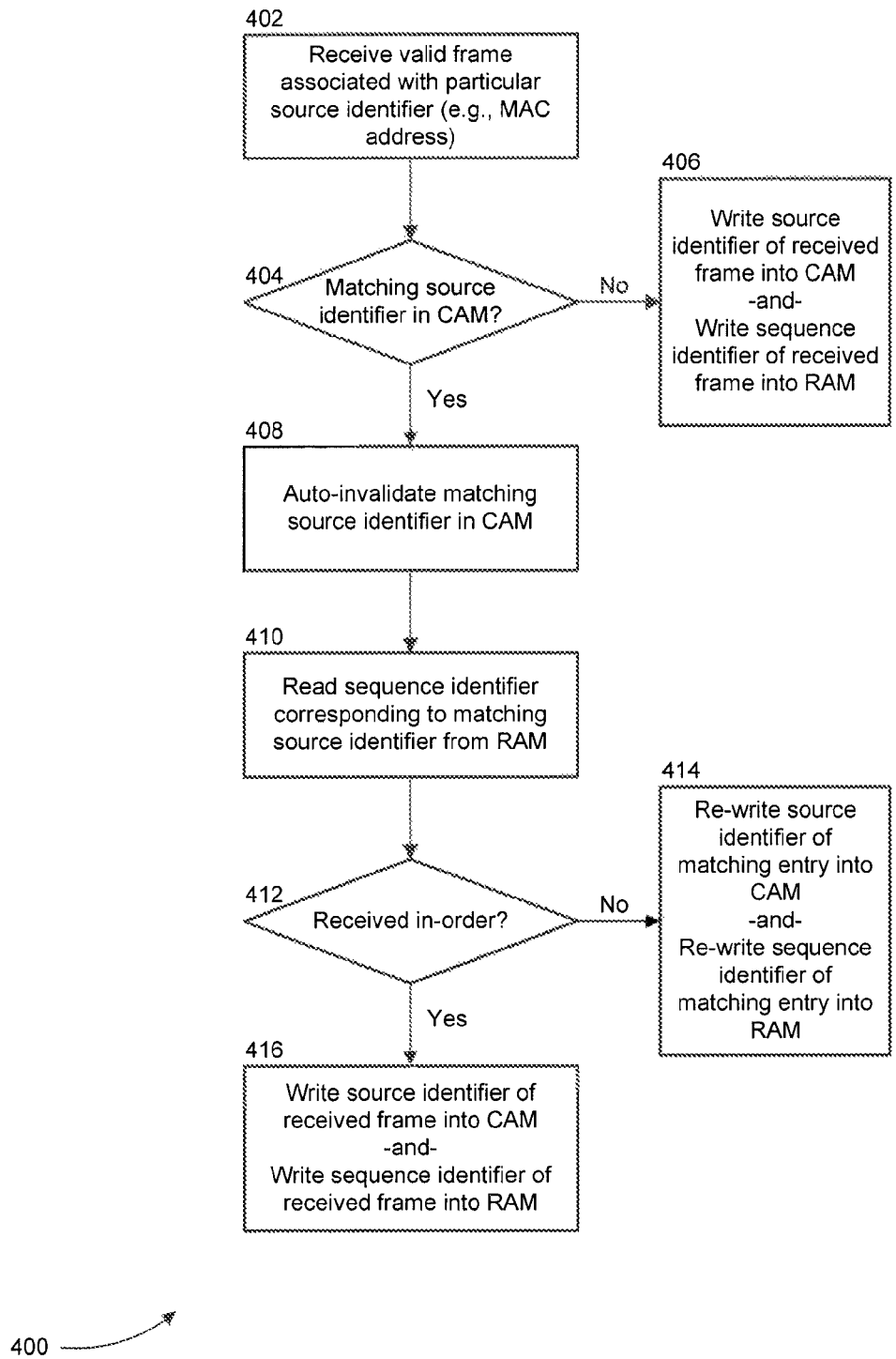
FIG. 4 illustrates a method for performing out-of-order message filtering in accordance with embodiments of the present disclosure.

FIG. 4 illustrates a method 400 for performing out-of-order frame filtering in accordance with embodiments of the present disclosure. Method 400 can be implemented, for example, by out-of-order frame filters 200 and 300 illustrated in FIG. 2 and FIG. 3, respectively. However, method 400 can be implemented by other out-of-order frame filters as would be recognized by one of ordinary skill in the art.

As shown in FIG. 4, method 400 begins at step 402 when a new frame is received that is associated with a particular source identifier (e.g., a MAC address).

After step 402, method 400 proceeds to step 404 where it is determined whether the source identifier of the new frame matches a source identifier, associated with a previously received frame, stored in a CAM.

If no matching source identifier is found in the CAM, method 400 proceeds to step 406. At step 406, the source identifier and sequence identifier of the new frame are written in the CAM and a RAM, respectively. Additionally, although not shown in FIG. 4, at step 406 a signal can be sent out to indicate that the new frame can be sent for processing.

If, on the other hand, a matching source identifier is found in the CAM, method 400 proceeds to step 408. At step 408, the matching source identifier in the CAM is auto-invalidated, and method 400 proceeds to step 410. At step 410, the sequence identifier corresponding to the matching source identifier is read from the RAM and method 400 proceeds to step 412.

At step 412, the sequence identifier of the new frame is compared to the sequence identifier read from the RAM at step 410.

If the comparison at step 412 indicates the new frame was not received in-order, method 400 proceeds to step 414. At step 414, the source identifier of the previously received message and its corresponding sequence identifier can be re-written into the CAM and RAM, respectively. Additionally, although not shown in FIG. 4, at step 414 the new frame can be filtered-out or flagged as being received out-of-order for appropriate handling.

If, on the other hand, the comparison at step 412 indicates the new frame was received in-order, method 400 proceeds to step 416. At step 416, the source identifier and sequence identifier of the new frame are written in the CAM and a RAM, respectively. Additionally, although not shown in FIG. 4, at step 406 a signal can be sent out to indicate that the new frame can be sent for processing.

3. CONCLUSION

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. An out-of-order message filter comprising:
    a content-addressable memory (CAM) configured to search a memory of the CAM for a source identifier of a first received message that matches a source identifier of a second received message and output a CAM address of the source identifier of the first received message;
    a random-access memory (RAM) configured to use the CAM address to read from a memory of the RAM a sequence identifier of the first received message; and
    a comparator, implemented at least in part in hardware, configured to perform a comparison between the sequence identifier of the first received message read from the RAM to a sequence identifier of the second received message,
    wherein the comparison determines whether the first received message was transmitted before or after the second received message,
    wherein the CAM is configured to auto-invalidate the source identifier of the first received message stored in the memory of the CAM after the source identifier of the first received message is matched to the source identifier of the second received message.

2. The filter of claim 1, wherein the filter is configured to store in the RAM one of either the sequence identifier of the first received message or the sequence identifier of the second received message based on the comparison.

3. The filter of claim 1, wherein the filter is configured to store in the RAM the sequence identifier of the first received message based on the comparison determining that the first received message was transmitted after the second received message.

4. The filter of claim 1, wherein the filter is configured to store in the RAM the sequence identifier of the second received message based on the comparison determining that the first received message was transmitted before the second received message.

5. The filter of claim 4, wherein the filter is configured to store the sequence identifier of the second received message in the RAM at a RAM address determined based on ages of sequence identifiers stored in the RAM.

6. The filter of claim 4, wherein the filter is configured to store the sequence identifier of the second received message in the RAM at a RAM address of a sequence identifier that has been stored in the RAM for a longest amount of time.

7. The filter of claim 4, further comprising:
    a counter configured to increment a write address pointer after the sequence identifier of the first received message is stored in the RAM, wherein the sequence identifier of the second received message is stored in the RAM at a RAM address determined based on the write address pointer.

8. The filter of claim 1, wherein the filter is configured to store in the CAM one of either the source identifier of the first received message or the source identifier of the second received message based on the comparison.

9. The filter of claim 1, wherein the filter is configured to store in the CAM the source identifier of the first received message based on the comparison determining that the first received message was transmitted after the second received message.

10. The filter of claim 1, wherein the filter is configured to store in the CAM the source identifier of the second received message based on the comparison determining that the first received message was transmitted before the second received message.

11. The filter of claim 1, wherein the source identifier of the first received message and the source identifier of the second received message are media access control (MAC) addresses.

12. An out-of-order message filter comprising:
    an auto-invalidate content-addressable memory (ACAM) configured to provide as output a CAM address of a source identifier of a first received message that matches a source identifier of a second received message;
    a random-access memory (RAM) configured to use the CAM address to read from a memory of the RAM a sequence identifier of the first received message; and
    a comparator, implemented at least in part in hardware, configured to perform a comparison between the sequence identifier of the first received message read from the RAM to a sequence identifier of the second received message, wherein the comparison determines whether the first received message was transmitted before or after the second received message.

13. The filter of claim 12, wherein the filter is configured to store in the RAM one of either the sequence identifier of the first received message or the sequence identifier of the second received message based on the comparison.

14. The filter of claim 12, wherein the filter is configured to store in the RAM the sequence identifier of the first received message based on the comparison determining that the first received message was transmitted after the second received message.

15. The filter of claim 12, wherein the filter is configured to store in the RAM the sequence identifier of the second received message based on the comparison determining that the first received message was transmitted before the second received message.

16. A method for performing out-of-order message filtering comprising:
    searching a content-addressable memory (CAM) for a source identifier of a first received message that matches a source identifier of a second received message;
    auto-invalidating the source identifier of the first received message stored in the CAM after the source identifier of the first received message is matched to the source identifier of the second received message;
    reading from a random-access memory (RAM) a sequence identifier of the first received message using a CAM address of the source identifier of the first received message; and
    comparing the sequence identifier of the first received message read from the RAM to a sequence identifier of the second received message to determine whether the first received message was transmitted before or after the second received message.

17. The method of claim 16, further comprising:
    storing in the RAM one of either the sequence identifier of the first received message or the sequence identifier of the second received message based on the comparing.

18. The method of claim 16, further comprising:
    storing in the RAM the sequence identifier of the first received message based on the comparing determining that the first received message was transmitted after the second received message.

19. The method of claim 16, further comprising:
  storing in the RAM the sequence identifier of the second received message based on the comparing determining that the first received message was transmitted before the second received message.

20. The method of claim 19, wherein the sequence identifier of the second received message is stored in the RAM at a RAM address of a sequence identifier that has been stored in the RAM for a longest amount of time.

\* \* \* \* \*